(12) United States Patent
Toda et al.

(10) Patent No.: US 11,958,467 B2
(45) Date of Patent: *Apr. 16, 2024

(54) HYBRID DRIVING APPARATUS

(71) Applicant: Mazda Motor Corporation, Hiroshima (JP)

(72) Inventors: Isao Toda, Aki-gun (JP); Seiyo Hirano, Aki-gun (JP); Hideki Sanai, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 827 days.

This patent is subject to a terminal disclaimer.

(21) Appl. No.: 16/980,852

(22) PCT Filed: Feb. 14, 2019

(86) PCT No.: PCT/JP2019/005271
§ 371 (c)(1),
(2) Date: Sep. 15, 2020

(87) PCT Pub. No.: WO2019/181296
PCT Pub. Date: Sep. 26, 2019

(65) Prior Publication Data
US 2021/0016765 A1 Jan. 21, 2021

(30) Foreign Application Priority Data

Mar. 20, 2018 (JP) .................... 2018-052637

(51) Int. Cl.
*B60W 20/10* (2016.01)
*B60K 6/24* (2007.10)
(Continued)

(52) U.S. Cl.
CPC ............... *B60W 20/10* (2013.01); *B60K 6/24* (2013.01); *B60K 6/26* (2013.01); *B60K 6/28* (2013.01);
(Continued)

(58) Field of Classification Search
CPC ...... B60W 20/10; B60W 10/06; B60W 10/08; B60L 53/20; B60L 53/50; B60L 15/20;
(Continued)

(56) References Cited

U.S. PATENT DOCUMENTS 6,333,620 B1 * 12/2001 Schmitz ................. B60L 50/61
320/132
7,877,184 B2 * 1/2011 Watanabe ................ B60K 6/40
903/906
(Continued)

FOREIGN PATENT DOCUMENTS

GB 2476109 A 6/2011
JP 06-046508 A 2/1994
(Continued)

OTHER PUBLICATIONS

International Search Report and Written Opinion dated May 14, 2019 for PCT/JP2019/005271 filed on Feb. 14, 2019, 11 pages including English Translation of the International Search Report.
(Continued)

*Primary Examiner* — Peter D Nolan
*Assistant Examiner* — Luke Huyhn
(74) *Attorney, Agent, or Firm* — XSENSUS LLP

(57) ABSTRACT

A hybrid driving apparatus is provided which enables a driver to sufficiently enjoy a driving feeling of a vehicle driven by an internal combustion engine. A hybrid driving apparatus includes an internal combustion engine that drive main driving wheels, a motive power transmission mechanism transmitting a driving force to the main driving wheels,
(Continued)

a main driving electric motor driving the main driving wheels, an accumulator, sub-driving electric motors transmitting motive power to sub-driving wheels of the vehicle, and a control apparatus executing an electric motor traveling mode and an internal combustion engine traveling mode. The control apparatus causes the internal combustion engine to generate the driving force, the internal combustion engine is a flywheel-less engine, and the control apparatus causes the main driving electric motor to generate a torque for maintaining idling of the internal combustion engine in the internal combustion engine traveling mode.

9 Claims, 9 Drawing Sheets

(51) Int. Cl.
*B60K 6/26* (2007.10)
*B60K 6/28* (2007.10)
*B60K 6/52* (2007.10)
*B60K 6/547* (2007.10)
*B60L 7/10* (2006.01)
*B60L 15/20* (2006.01)
*B60L 53/20* (2019.01)
*B60L 53/50* (2019.01)
*B60W 10/06* (2006.01)
*B60W 10/08* (2006.01)

(52) U.S. Cl.
CPC ............... *B60K 6/52* (2013.01); *B60K 6/547* (2013.01); *B60L 7/10* (2013.01); *B60L 15/20* (2013.01); *B60L 53/20* (2019.02); *B60L 53/50* (2019.02); *B60W 10/06* (2013.01); *B60W 10/08* (2013.01); *B60W 2710/06* (2013.01); *B60W 2710/08* (2013.01); *B60Y 2200/92* (2013.01); *B60Y 2300/18008* (2013.01); *B60Y 2300/43* (2013.01); *B60Y 2300/60* (2013.01); *B60Y 2400/82* (2013.01)

(58) Field of Classification Search
CPC .... B60L 7/10; B60K 6/24; B60K 6/26; B60K 6/28; B60K 6/52; B60K 6/547

USPC .......................................................... 701/22
See application file for complete search history.

(56) References Cited

U.S. PATENT DOCUMENTS

| | | | |
|---|---|---|---|
| 9,789,871 B1 | 10/2017 | Dlala et al. | |
| 11,364,783 B2* | 6/2022 | Toda ........................ | B60K 6/52 |
| 2006/0169506 A1* | 8/2006 | Handa ...................... | B60K 6/26 |
| | | | 180/65.51 |
| 2010/0133023 A1 | 6/2010 | Tang | |
| 2011/0168469 A1 | 7/2011 | Hansson | |
| 2012/0143426 A1 | 6/2012 | Yamamoto et al. | |
| 2014/0368041 A1 | 12/2014 | Tu et al. | |
| 2015/0210171 A1 | 7/2015 | King et al. | |

FOREIGN PATENT DOCUMENTS

| | | | |
|---|---|---|---|
| JP | 10-288063 A | 10/1998 | |
| JP | 2001-231107 A | 8/2001 | |
| JP | 2002-364407 A | 12/2002 | |
| JP | 2004-187412 A | 7/2004 | |
| JP | 2004-316736 A | 11/2004 | |
| JP | 2005-178479 A | 7/2005 | |
| JP | 2006-158173 A | 6/2006 | |
| JP | 2006-321488 A | 11/2006 | |
| JP | 2009-268343 A | 11/2009 | |
| JP | 2011-031744 A | 2/2011 | |
| JP | 2011-110966 A | 6/2011 | |
| JP | 2011-218914 A | 11/2011 | |
| JP | 2012-066609 A | 4/2012 | |
| JP | 2013-163436 A | 8/2013 | |
| JP | 5280961 B2 | 9/2013 | |
| JP | 2015-074293 A | 4/2015 | |
| KR | 10-1551120 B1 | 9/2015 | |
| WO | 2017/122776 A1 | 7/2017 | |

OTHER PUBLICATIONS

Office Action dated Aug. 16, 2021, in corresponding Japanese patent Application No. 2018-052637, 11 pages.
Extended European search report dated Mar. 29, 2021, in corresponding European patent Application No. 19772570.8, 9 pages.

* cited by examiner

HYBRID DRIVING APPARATUS

CROSS-REFERENCE TO RELATED APPLICATIONS

The present application is based on PCT filing PCT/JP2019/005271, filed Feb. 14, 2019, which claims priority to JP 2018-052637, filed Mar. 20, 2018 the entire contents of each are incorporated herein by reference.

TECHNICAL FIELD

The present invention relates to a hybrid driving apparatus and particularly to a hybrid driving apparatus for driving a vehicle.

BACKGROUND ART

In recent years, regulation of emission gas from vehicles has been strengthened in countries all over the world, and requests about fuel consumption of vehicles, the emission amount of carbon dioxide per traveling distance, and so forth have become strict. Further, there are cities that regulate entrance of vehicles traveling by an internal combustion engine into urban areas. In order to satisfy those requests, hybrid driving vehicles including an internal combustion engine and an electric motor and electric automobiles driven only by an electric motor have been developed and widely spread.

Japanese Patent No. 5280961 (Patent Literature 1) discloses a driving control apparatus for a vehicle. In this driving control apparatus, a driving apparatus is provided on a rear wheel side of the vehicle, and two electric motors included in the driving apparatus respectively drive rear wheels of the vehicle. Further, other than this driving apparatus, a driving unit in which an internal combustion engine and an electric motor are connected together in series is provided in a front portion of the vehicle. Motive power of the driving unit is transmitted to front wheels via a transmission and a main driving shaft, and motive power of the driving apparatus is transmitted to the rear wheels of the vehicle. Further, in this driving control apparatus, in a start of traveling of the vehicle, the two electric motors of the driving apparatus are driven, these driving forces are respectively transmitted to the rear wheels of the vehicle. In addition, the driving unit generates a driving force in acceleration of the vehicle, and four-wheel driving by the driving unit and the two electric motors of the driving apparatus is performed. As described above, in the driving control apparatus disclosed in Patent Literature 1, the two electric motors respectively provided to the rear wheels of the vehicle mainly generate driving forces.

CITATION LIST

Patent Literature

Patent Literature 1: Japanese Patent No. 5280961

SUMMARY OF INVENTION

Technical Problem

Driving a vehicle by an electric motor does not cause emission of carbon dioxide during traveling and is thus advantageous for complying with regulation of emission gas strengthened year by year; however, electric power capable of being accumulated in a battery is limited, and it is difficult to secure a sufficiently long range. Thus, as a driving apparatus for a vehicle, a hybrid driving apparatus has widely been spread on which an internal combustion engine is mounted together with an electric motor. Further, as for such a hybrid driving apparatus also, in order to reduce the emission amount of carbon dioxide during traveling, vehicles have been increasing which mainly use a driving force by an electric motor as a vehicle disclosed in Patent Literature 1.

In a hybrid driving apparatus mainly using a driving force by an electric motor, it is necessary to mount a battery with a large capacity in order to secure sufficient traveling performance. Further, in order to obtain a sufficient driving force by an electric motor, it is necessary to cause an electric motor to work at a comparatively high voltage. Thus, in a hybrid driving apparatus mainly using a driving force by an electric motor, a battery with a large capacity is requested, and it is necessary to sufficiently electrically insulate an electric system supplying a high voltage to the electric motor. Those increase the whole weight of the vehicle and deteriorate fuel consumption of the vehicle. In addition, there is a problem that a vicious circle occurs in which a battery with a larger capacity and a high voltage are needed in order to drive a vehicle with a large weight by an electric motor and this results in a further increase in the weight.

Meanwhile, traveling by a vehicle driven by an internal combustion engine gives a unique feeling, and there are many devoted fans who prefer driving of vehicles with an internal combustion engine. However, due to regulation of emission gas strengthened year by year, it is anticipated that continuing to use vehicles driven by an internal combustion engine will become difficult. An internal combustion engine is also included in a vehicle including a hybrid driving apparatus; however, in many cases, in order to sufficiently reduce fuel consumption, both of a driving force by an internal combustion engine and a driving force by an electric motor are used. Thus, there is a problem that even if the internal combustion engine is caused to work in the hybrid driving apparatus, a driver may not sense a feeling of the vehicle driven by the internal combustion engine and may not enjoy driving the vehicle with the internal combustion engine.

Accordingly, an object of the present invention is to provide a hybrid driving apparatus that can prevent a vicious circle of reinforcement of driving by an electric motor and a vehicle weight increase and enable a driver to sufficiently enjoy a driving feeling of a vehicle driven by an internal combustion engine.

Solution to Problem

To solve the above problem, the present invention provides a hybrid driving apparatus driving a vehicle, the hybrid driving apparatus characterized by including: an internal combustion engine generating a driving force for main driving wheels of the vehicle; a motive power transmission mechanism transmitting the driving force generated by the internal combustion engine to the main driving wheels; a main driving electric motor as a permanent magnet electric motor generating a driving force for the main driving wheels; an accumulator accumulating electric power causing the main driving electric motor to work; sub-driving electric motors as induction electric motors being connected with sub-driving wheels of the vehicle so as to be capable of transmitting motive power to the sub-driving wheels; and a control apparatus controlling the internal combustion engine, the main driving electric motor, and the sub-driving electric motors and executing an electric motor traveling mode and an internal combustion engine traveling mode, in which the driving force generated by the main driving electric motor is transmitted to the main driving wheels via at least a portion of the motive power transmission mechanism, the control apparatus causes only the main driving electric motor to generate the driving force in a start of traveling and steady traveling of the vehicle in the electric motor traveling mode and causes the sub-driving electric motor to regenerate electric power in deceleration of the vehicle, the control apparatus causes the internal combustion engine to generate the driving force but does not cause the main driving electric motor and the sub-driving electric motors to generate driving forces for driving the vehicle in the internal combustion engine traveling mode, the internal combustion engine is a flywheel-less engine that does not include a flywheel, and the control apparatus causes the main driving electric motor to generate a torque for maintaining idling of the internal combustion engine in the internal combustion engine traveling mode.

In the present invention configured as described above, the driving force generated by the internal combustion engine is transmitted to the main driving wheels via the motive power transmission mechanism, and the driving force generated by the main driving electric motor by electric power supplied from the accumulator is transmitted to the main driving wheels via at least a portion of the motive power transmission mechanism. Meanwhile, the sub-driving electric motors are connected with the sub-driving wheels so as to be capable of transmitting motive power to the sub-driving wheels. The control apparatus controls the internal combustion engine, the main driving electric motor, and the sub-driving electric motors and executes the electric motor traveling mode and the internal combustion engine traveling mode. Only the main driving electric motor generates the driving force in a start of traveling and steady traveling of the vehicle in the electric motor traveling mode, and the sub-driving electric motors regenerate electric power in deceleration of the vehicle. Further, in the internal combustion engine traveling mode, the internal combustion engine is caused to generate the driving force, but the main driving electric motor and the sub-driving electric motors are not caused to generate the driving force for driving the vehicle. In the internal combustion engine traveling mode, the control apparatus causes the main driving electric motor to generate the torque for maintaining idling of the internal combustion engine as a flywheel-less engine.

In the present invention configured as described above, in the internal combustion engine traveling mode, the internal combustion engine generates the driving force, and the main driving electric motor and the sub-driving electric motors do not generate the driving forces for driving the vehicle. Thus, a driver can sufficiently enjoy a driving feeling of the vehicle driven by the internal combustion engine while using the hybrid driving apparatus. Further, in a start of traveling and steady traveling of the vehicle, the permanent magnet electric motor as the main driving electric motor generates the driving force, the permanent magnet electric motor being capable of obtaining a comparatively large torque in a region of a low rotation speed. Thus, the vehicle can efficiently be driven. Meanwhile, in deceleration of the vehicle, the induction electric motor as the sub-driving electric motor provided to the sub-driving wheel regenerates electric power. Thus, electric power can be regenerated by the compara-tively light induction electric motor, and energy efficiency can be improved while a weight increase of the vehicle is inhibited.

In addition, a flywheel-less engine is employed as the internal combustion engine, weight reduction can thereby be realized in spite of a hybrid driving apparatus, and a response of the internal combustion engine in the internal combustion engine traveling mode is also improved. The driver can enjoy a further excellent driving feeling. Further, in the internal combustion engine traveling mode, the main driving electric motor generates the torque for maintaining idling of the internal combustion engine. Thus, even if a flywheel-less engine is employed, stable idling with less vibration can be performed.

In the present invention, the hybrid driving apparatus preferably further includes a stepped transmission being provided in an intermediate portion of the motive power transmission mechanism transmitting motive power to the main driving wheels, in which in the internal combustion engine traveling mode, the control apparatus preferably controls the sub-driving electric motors such that a torque shock in gear-shifting of the stepped transmission is reduced and causes the sub-driving wheels to generate driving forces or braking forces.

In the present invention configured as described above, the sub-driving wheels generate driving forces or braking forces such that a torque shock is reduced, the torque shock occurring in gear-shifting of the stepped transmission provided to the motive power transmission mechanism for driving the main driving wheels. Thus, the driving forces or braking forces generated by the sub-driving wheels are not influenced by dynamic characteristics of the motive power transmission mechanism, the driving forces or braking forces can directly be applied to the vehicle, and a torque shock can effectively be reduced.

In the present invention, the hybrid driving apparatus preferably further includes a capacitor accumulating electric power regenerated by the sub-driving electric motors, in which the sub-driving electric motor is preferably driven only by electric power supplied via the capacitor.

In general, a capacitor can instantaneously supply a larger current than an ordinary battery. In the present invention configured as described above, because the sub-driving electric motors are driven only by electric power supplied via the capacitor, the sub-driving electric motors can instantaneously generate high torques, and a torque shock can more effectively be reduced. Further, because a portion of necessary electric power is supplied from the capacitor, the accumulator can further be downsized.

In the present invention, the capacitor and the accumulator are preferably connected together in series, and after electric power regenerated by the sub-driving electric motors is accumulated in the capacitor, a portion of an accumulated electric charge is preferably charged to the accumulator via a voltage converter.

In the present invention configured as described above, because a portion of electric power regenerated by the sub-driving electric motors is charged from the capacitor to the accumulator via the voltage converter, electric power regenerated by the sub-driving electric motors can also be used for driving of the main driving electric motor. Accordingly, kinetic energy of the vehicle can efficiently be collected as electric energy.

Advantageous Effects of Invention

A hybrid driving apparatus of the present invention can prevent a vicious circle of reinforcement of driving by an electric motor and a vehicle weight increase and enable a driver to sufficiently enjoy a driving feeling of a vehicle driven by an internal combustion engine.

DESCRIPTION OF EMBODIMENTS

Preferable embodiments of the present invention will next be described with reference to the attached drawings.

Figure 1:
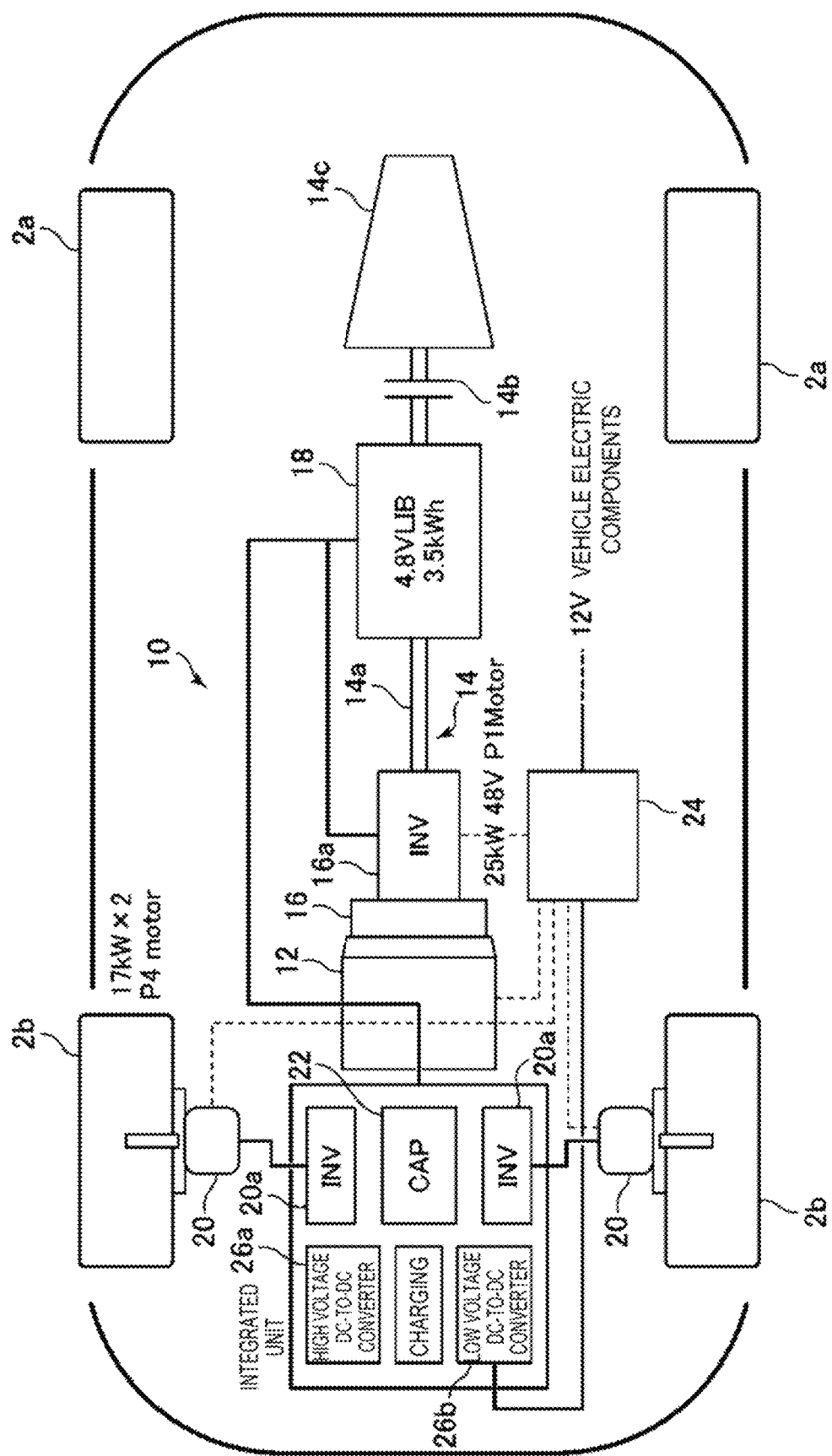
FIG. 1 is a layout diagram illustrating a vehicle on which a hybrid driving apparatus according to an embodiment of the present invention is mounted.
Figure 2:
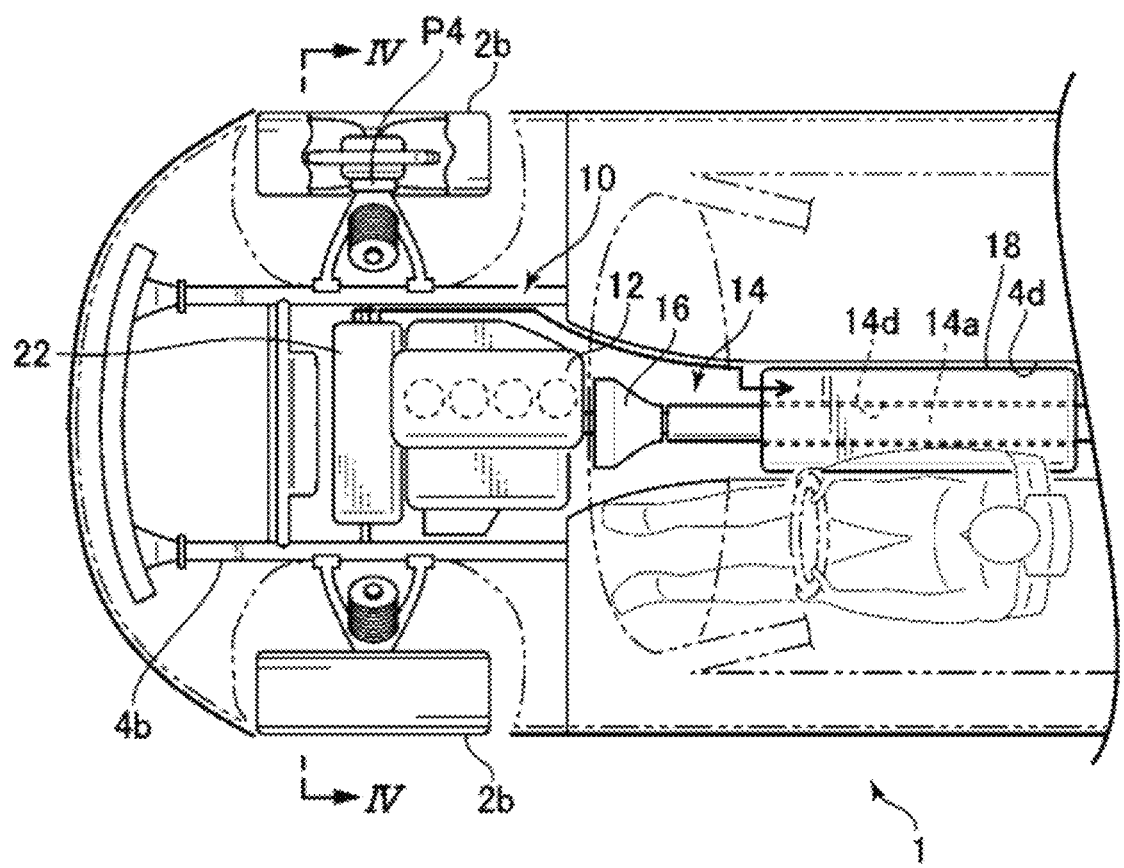
FIG. 2 is a perspective view illustrating a front portion of the vehicle on which the hybrid driving apparatus according to the embodiment of the present invention is mounted, the front portion as seen from above.
Figure 3:
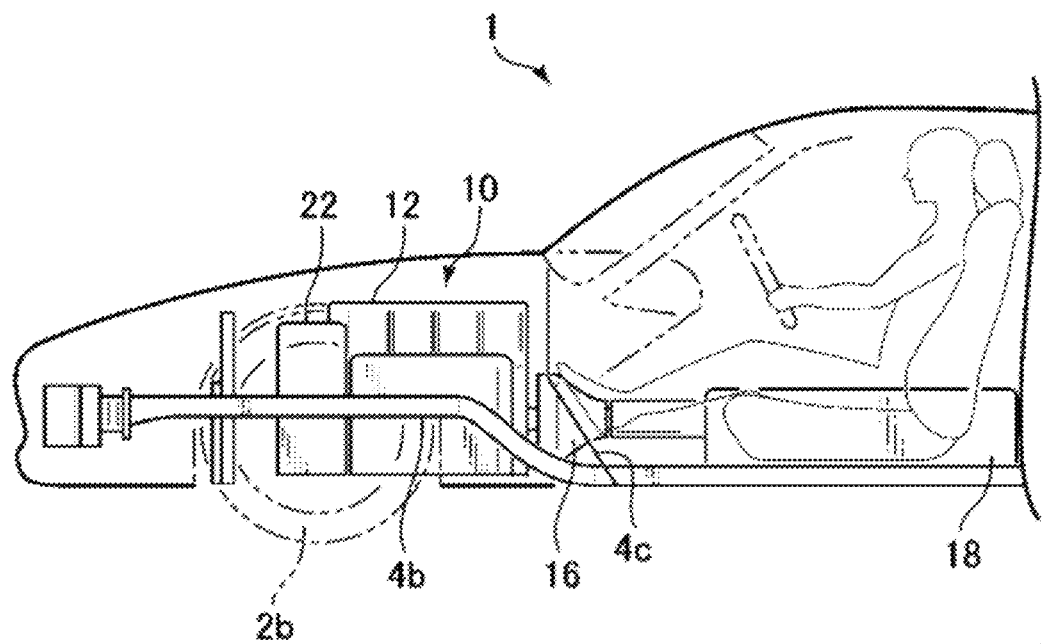
FIG. 3 is a perspective view illustrating the front portion of the vehicle on which the hybrid driving apparatus according to the embodiment of the present invention is mounted, the front portion as seen from a side.
Figure 4:
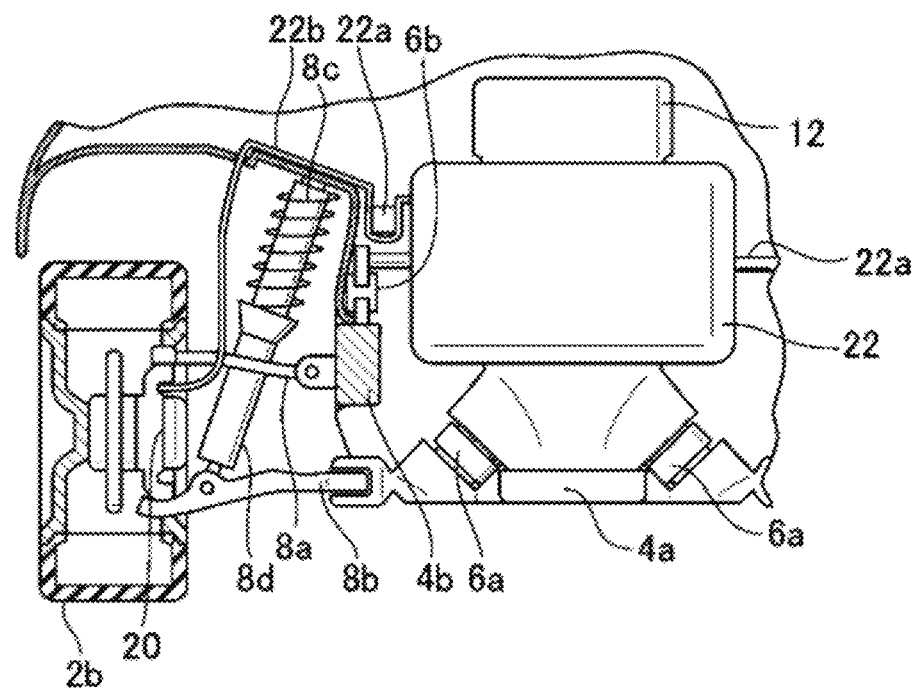
FIG. 4 is a cross-sectional view taken along line iv-iv in FIG. 2.

FIG. 1 is a layout diagram of a vehicle on which a hybrid driving apparatus according to an embodiment of the present invention is mounted. FIG. 2 is a perspective view of a front portion of the vehicle on which the hybrid driving apparatus of this embodiment is mounted, the front portion as seen from above. FIG. 3 is a perspective view of the front portion of the vehicle as seen from a side. FIG. 4 is a cross-sectional view taken along line iv-iv in FIG. 2.

As illustrated in FIG. 1, a vehicle 1 on which the hybrid driving apparatus according the embodiment of the present invention is mounted is a so-called FR (front engine, rear drive) vehicle in which an engine 12 as an internal combustion engine is mounted on the front portion of the vehicle in front of a driver seat and a pair of left and right rear wheels 2a as main driving wheels are driven. Further, as described later, the rear wheels 2a are also driven by a main driving motor as a main driving electric motor, and a pair of left and right front wheels 2b as sub-driving wheels are driven by sub-driving motors as sub-driving electric motors.

A hybrid driving apparatus 10 according to the embodiment of the present invention, which is mounted on the vehicle 1, has the engine 12 driving the rear wheels 2a, a motive power transmission mechanism 14 transmitting a driving force to the rear wheels 2a, a main driving motor 16 driving the rear wheels 2a, a battery 18 as an accumulator, sub-driving motors 20 driving the front wheels 2b, a capacitor 22, and a control apparatus 24.

The engine 12 is an internal combustion engine for generating the driving force for the rear wheels 2a as the main driving wheels of the vehicle 1. As illustrated in FIGS. 2 to 4, in this embodiment, an in-line four-cylinder engine is employed as the engine 12, and the engine 12 disposed in the front portion of the vehicle 1 drives the rear wheels 2a via the motive power transmission mechanism 14. Further, as illustrated in FIG. 4, in this embodiment, the engine 12 is a flywheel-less engine not including a flywheel and is installed in a subframe 4a of the vehicle 1 via an engine mount 6a. In addition, the subframe 4a is fastened and fixed to a lower portion of a front side frame 4b and to a lower portion of a dash panel 4c at a rear end of the lower portion of the front side frame 4b.

The motive power transmission mechanism 14 is configured to transmit a driving force generated by the engine 12 to the rear wheels 2a as the main driving wheels. As illustrated in FIG. 1 to FIG. 3, the motive power transmission mechanism 14 includes a propeller shaft 14a, a clutch 14b, and a transmission 14c as a stepped transmission, which are connected with the engine 12. The propeller shaft 14a extends, inside a propeller shaft tunnel 4d (FIG. 2), from the engine 12 disposed in the front portion of the vehicle 1 to the rear of the vehicle 1. A rear end of the propeller shaft 14a is connected with the transmission 14c via the clutch 14b. An output shaft of the transmission 14c is connected with an axle (not illustrated) of the rear wheels 2a and drives the rear wheels 2a.

Note that in this embodiment, the transmission 14c is in a so-called transaxle arrangement. Accordingly, because a transmission body with a large diameter is not present in a position immediately in the rear of the engine 12, the width of a floor tunnel (propeller shaft tunnel 4d) may be made small, a foot space of an occupant on a central side may be secured, and the occupant may enable his/her lower body to take a bilaterally symmetrical posture directly opposed to a direct front. In addition, while this posture of the occupant is secured, it becomes easy to set the outer diameter and length of the main driving motor 16 to sufficient sizes corresponding to the output.

The main driving motor 16 is an electric motor for generating a driving force for the main driving wheels and is disposed adjacently to the engine 12 on a rear side of the engine 12. Further, an inverter (INV) 16a is disposed adjacently to the main driving motor 16, and the inverter 16a converts a current from the battery 18 to an alternate current and supplies the alternate current to the main driving motor 16. In addition, as illustrated in FIG. 2 and FIG. 3, the main driving motor 16 is connected with the engine 12 in series, and the driving force generated by the main driving motor 16 is transmitted to the rear wheels 2a via the motive power transmission mechanism 14. Alternatively, the present invention may be configured such that the main driving motor 16 is connected with an intermediate portion of the motive power transmission mechanism 14 and the driving force is transmitted to the rear wheels 2a via a portion of the motive power transmission mechanism 14. Further, in this embodiment, as the main driving motor 16, a permanent magnet electric motor (permanent magnet synchronous electric motor) of 25 kW driven at 48 V is employed.

The battery 18 is an accumulator for accumulating electric power for mainly causing the main driving motor 16 to work. Further, as illustrated in FIG. 2, in this embodiment, the battery 18 is disposed in an internal portion of the propeller shaft tunnel 4d so as to surround a torque tube 14d covering the propeller shaft 14a. In addition, in this embodiment, as the battery 18, a lithium ion battery (LIB) of 48 V and 3.5 kWh is used.

Note that as described above, because the transaxle arrangement is employed in this embodiment, the volume for housing the battery 18 may be enlarged toward a space in front of the floor tunnel (propeller shaft tunnel 4d), the space being produced by the transaxle arrangement. Accordingly, it becomes possible to secure the capacity of the battery 18 and enlarge the battery 18 without narrowing a central-side space for the occupant due to widening of the width of the floor tunnel.

As illustrated in FIG. 4, the sub-driving motor 20 is provided to each of the front wheels 2b in an unsprung portion of the vehicle 1 so as to generate a driving force for the front wheel 2b as the sub-driving wheel. In this embodiment, each of the front wheels 2b is supported by a double wishbone suspension and is suspended by an upper arm 8a, a lower arm 8b, a spring 8c, and a shock absorber 8d. Further, the sub-driving motors 20 are in-wheel motors and are respectively housed in wheels of the front wheels 2b. Consequently, the sub-driving motors 20 are configured to be provided in a so-called "unsprung portion" of the vehicle 1 and to respectively drive the front wheels 2b. Further, as illustrated in FIG. 1, currents from the capacitor (CAP) 22 are respectively converted to alternate currents by inverters 20a and are then supplied to the sub-driving motors 20. In addition, in this embodiment, a speed reducer is not provided to the sub-driving motor 20, and the driving force of the sub-driving motor 20 is directly transmitted to the front wheel 2b. Further, in this embodiment, as each of the sub-driving motors 20, an induction electric motor of 17 kW is employed.

The capacitor (CAP) 22 is provided to accumulate electric power regenerated by the sub-driving motors 20. As illustrated in FIG. 2 and FIG. 3, the capacitor 22 is disposed immediately in front of the engine 12 and supplies electric power to the sub-driving motor 20 provided to each of the front wheels 2b of the vehicle 1. As illustrated in FIG. 4, as for the capacitor 22, brackets 22a protruding from side surfaces on both sides of the capacitor 22 are supported by the front side frame 4b via a capacitor mount 6b. Further, a harness 22b extending from the sub-driving motor 20 to the capacitor 22 is led to an engine room through a side portion upper end of a wheel well wall. In addition, the capacitor 22 is configured to accumulate an electric charge at a higher voltage than the battery 18 and is disposed in a region between the left and right front wheels 2b as the sub-driving wheels. The sub-driving motor 20 driven mainly by electric power accumulated in the capacitor 22 is driven at a higher voltage than the main driving motor 16.

The control apparatus 24 is configured to control the engine 12, the main driving motor 16, and the sub-driving motors 20 and to execute an electric motor traveling mode and an internal combustion engine traveling mode. Specifically, the control apparatus 24 may be configured with a microprocessor, a memory, an interface circuit, a program causing those to work (all not illustrated), and so forth. Details of control by the control apparatus 24 will be described later.

Further, as illustrated in FIG. 1, in the vicinity of the capacitor 22, a high voltage DC-to-DC converter 26a and a low voltage DC-to-DC converter 26b as voltage converters are disposed. The high voltage DC-to-DC converter 26a, the low voltage DC-to-DC converter 26b, the capacitor 22, and the two inverters 20a form a unit and configure an integrated unit.

Next, a description will be made about a power source configuration, driving of the vehicle 1 by the motors in the hybrid driving apparatus 10 according to the embodiment of the present invention with reference to FIG. 5 to FIG. 7.

Figure 5:
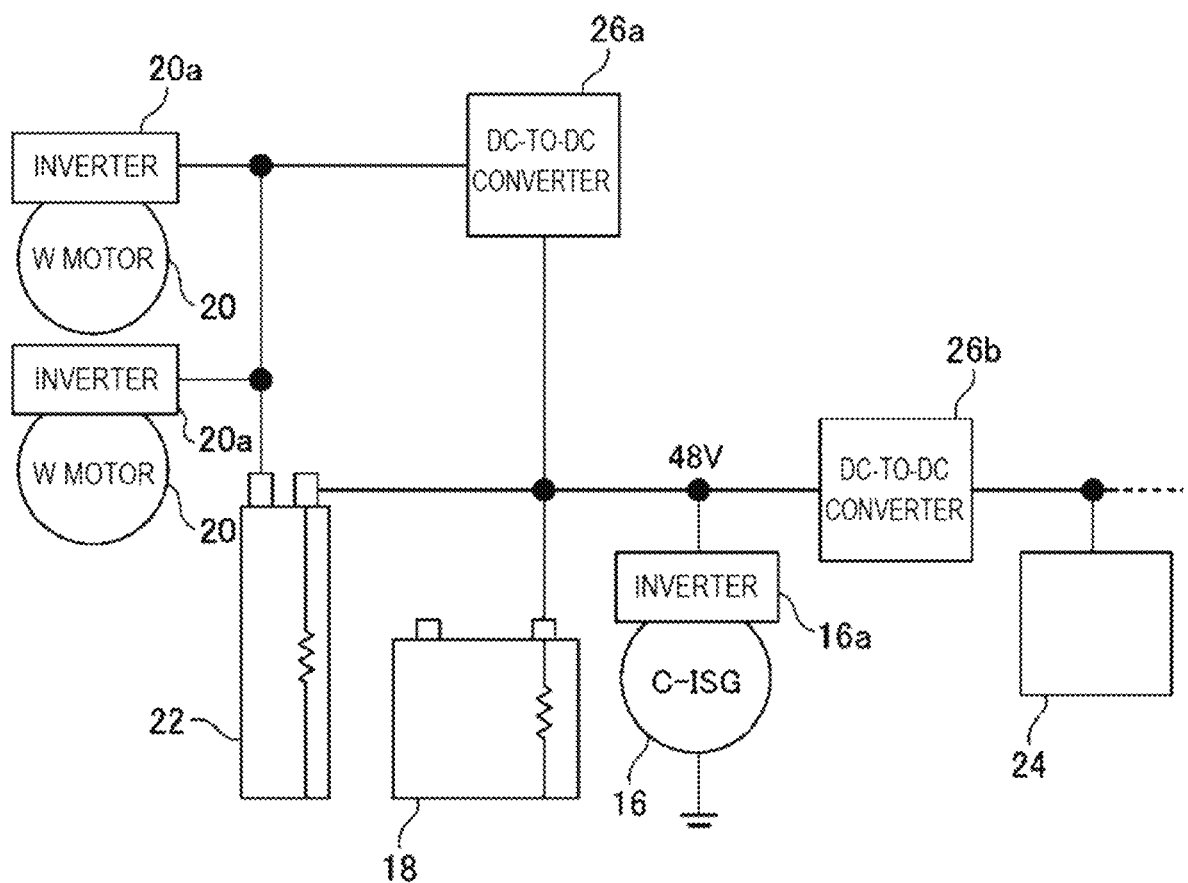
FIG. 5 is a block diagram illustrating a power source configuration of the hybrid driving apparatus according to the embodiment of the present invention.

FIG. 5 is a block diagram illustrating the power source configuration of the hybrid driving apparatus 10 according to the embodiment of the present invention. FIG. 6 is a diagram schematically illustrating one example of a change in a voltage in a case where electric power is regenerated to the capacitor 22 in the hybrid driving apparatus 10 of this embodiment. FIG. 7 is a diagram illustrating the relationship between the outputs of the motors and the vehicle speed, the motors being used in the hybrid driving apparatus 10 according to the embodiment of the present invention.

First, a description will be made about the power source configuration of the hybrid driving apparatus 10 according to the embodiment of the present invention. As illustrated in FIG. 5, the battery 18 and the capacitor 22 included in the hybrid driving apparatus 10 are connected together in series. The main driving motor 16 is driven at approximately 48 V as a reference output voltage of the battery 18, and the sub-driving motor 20 is driven at a maximum of 120 V, which is higher than 48 V as the sum of an output voltage of the battery 18 and an inter-terminal voltage of the capacitor 22. Thus, the sub-driving motor 20 is always driven by electric power supplied via the capacitor 22.

Further, the inverter 16a is attached to the main driving motor 16 and converts an output of the battery 18 to an alternate current, and the main driving motor 16 as a permanent magnet electric motor is then driven. Similarly, the inverters 20a are respectively attached to the sub-driving motors 20 and convert outputs of the battery 18 and the capacitor 22 to alternate currents, and the sub-driving motors 20 as induction electric motors are then driven. Note that because the sub-driving motor 20 is driven at a higher voltage than the main driving motor 16, high insulation is requested from the harness (wire) 22b supplying electric power to the sub-driving motor 20. However, the capacitor 22 is disposed adjacently to each of the sub-driving motors 20, a weight increase due to enhancement of insulation of the harness 22b may be suppressed to a minimum.

In addition, in deceleration or the like of the vehicle 1, the main driving motor 16 and the sub-driving motors 20 function as generators and produce electric power by performing regeneration from kinetic energy of the vehicle 1. Electric power regenerated by the main driving motor 16 is accumulated in the battery 18, and electric power regenerated by the sub-driving motors 20 is mainly accumulated in the capacitor 22.

Further, the high voltage DC-to-DC converter 26a as a voltage converter is connected between the battery 18 and the capacitor 22. When the electric charge accumulated in the capacitor 22 is running short (when the inter-terminal voltage of the capacitor 22 lowers), the high voltage DC-to-DC converter 26a boosts the voltage of the battery 18 and charges the capacitor 22. Meanwhile, in a case where the inter-terminal voltage of the capacitor 22 rises to a predetermined voltage or higher by regeneration of energy by the sub-driving motors 20, the electric charge accumulated in the capacitor 22 is dropped and applied to the battery 18, and the battery 18 is charged. That is, the electric power regenerated by the sub-driving motors 20 is accumulated in the capacitor 22, and a portion of the accumulated electric charge is thereafter charged to the battery 18 via the high voltage DC-to-DC converter 26*a*.

In addition, the low voltage DC-to-DC converter 26*b* is connected between the battery 18 and 12 V electric components of the vehicle 1. Because the control apparatus 24 of the hybrid driving apparatus 10 and most electric components of the vehicle 1 work at a voltage of 12 V, the electric charge accumulated in the battery 18 is dropped to 12 V by the low voltage DC-to-DC converter 26*b* and supplied to those devices.

Next, charging and discharging with respect to the capacitor 22 will be described with reference to FIG. 6.

Figure 6:
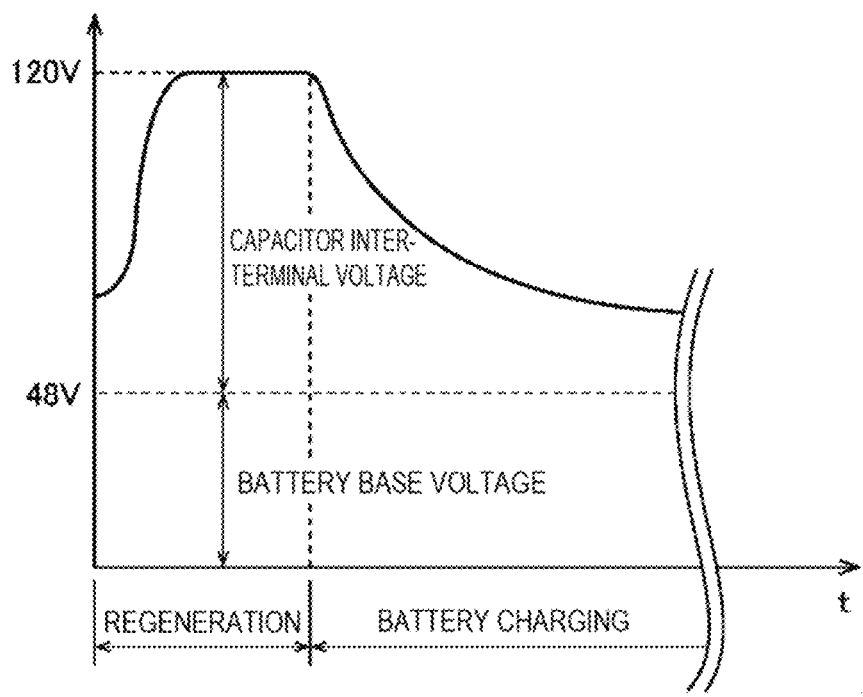
FIG. 6 is a diagram schematically illustrating one example of a change in a voltage in a case where electric power is regenerated to a capacitor in the hybrid driving apparatus according to the embodiment of the present invention.

As illustrated in FIG. 6, the voltage of the capacitor 22 corresponds to the total of a base voltage by the battery 18 and the inter-terminal voltage of the capacitor 22 itself. In deceleration or the like of the vehicle 1, electric power is regenerated by the sub-driving motors 20, and the regenerated electric power is charged to the capacitor 22. When the capacitor 22 is charged, the inter-terminal voltage rises comparatively rapidly. When the voltage of the capacitor 22 rises to a predetermined voltage or higher by the charging, the high voltage DC-to-DC converter 26*a* drops the voltage of the capacitor 22, and the battery 18 is charged. As illustrated in FIG. 6, this charging from the capacitor 22 to the battery 18 is comparatively gently performed compared to charging to the capacitor 22, and the voltage of the capacitor 22 is lowered to a proper voltage comparatively gently.

That is, the electric power regenerated by the sub-driving motors 20 is temporarily accumulated in the capacitor 22 and is thereafter gently charged to the battery 18. Note that depending on a period in which regeneration is performed, regeneration of electric power by the sub-driving motors 20 and charging from the capacitor 22 to the battery 18 may be performed in an overlapping manner.

Meanwhile, the electric power regenerated by the main driving motor 16 is directly charged to the battery 18.

Next, a description will be made about the relationship between the vehicle speed and the outputs of the motors in the hybrid driving apparatus 10 according to the embodiment of the present invention with reference to FIG. 7. FIG. 7 is a graph representing the relationship between the vehicle speed of the vehicle 1 and the outputs of the motors at each speed in the hybrid driving apparatus 10 according to this embodiment. In FIG. 7, the output of the main driving motor 16 is indicated by a broken line, the output of one sub-driving motor 20 is indicated by a one-dot chain line, the total of the outputs of the two sub-driving motors 20 is indicated by a two-dot chain line, and the total of the outputs of all the motors is indicated by a solid line.

Figure 7:
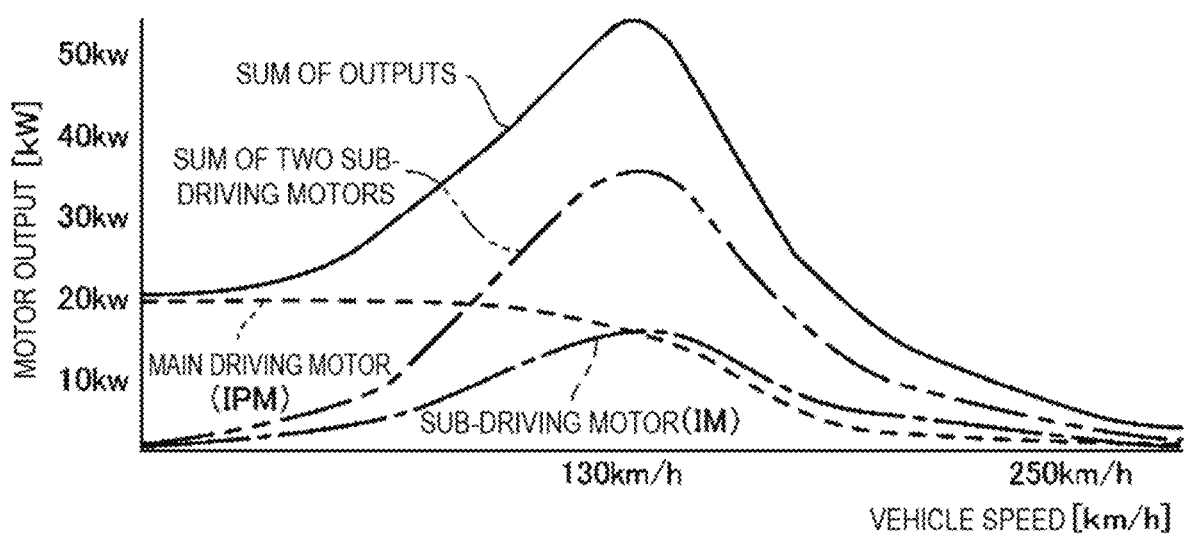
FIG. 7 is a diagram illustrating the relationship between the outputs of motors and the vehicle speed, the motors being used in the hybrid driving apparatus according to the embodiment of the present invention.

In this embodiment, because a permanent magnet electric motor is employed for the main driving motor 16, as indicated by the broken line in FIG. 7, the output of the main driving motor 16 is high in a low vehicle speed region in which the motor rotation speed is low, and a motor output capable of being output decreases as the vehicle speed becomes faster. That is, in this embodiment, the main driving motor 16 is driven at approximately 48 V and outputs a torque of approximately 200 Nm as the maximum torque to about 1,000 rpm, and the torque lowers at approximately 1,000 rpm or higher as the rotation speed increases.

Further, in this embodiment, the main driving motor 16 is configured to be capable of obtaining a continuous output of approximately 20 kW in the lowest speed region and of obtaining a maximum output of approximately 25 kW.

Meanwhile, because induction electric motors are employed for the sub-driving motors 20, as indicated by the one-dot chain line and the two-dot chain line in FIG. 7, the output of the sub-driving motor 20 is very low in the low vehicle speed region in which the motor rotation speed is low, the output increases as the vehicle speed becomes faster, the maximum output is obtained around a vehicle speed of approximately 130 km/h, and the motor output thereafter decreases. In this embodiment, the sub-driving motor 20 is configured to be driven at approximately 120 V and configured such that around a vehicle speed of approximately 130 km/h, an output of approximately 17 kW for one sub-driving motor 20 and a total output of approximately 34 kW for two sub-driving motors 20 are obtained. That is, in this embodiment, the torque curve of the sub-driving motor 20 has a peak from approximately 600 to 800 rpm, and a maximum torque of approximately 200 Nm is obtained.

The solid line in FIG. 7 indicates the total of the outputs of the main driving motor 16 and the two sub-driving motors 20. As it is clear from the graph, in this embodiment, a maximum output of approximately 53 kW is obtained around a vehicle speed of approximately 130 km/h, and this maximum output at this vehicle speed may satisfy a traveling condition requested in the WLTP test. Note that the solid line in FIG. 7 indicates the sum of output values of the two sub-driving motors 20 even in the low vehicle speed region; however, as described later, the sub-driving motors 20 are actually not driven in the low vehicle speed region. That is, the vehicle is driven only by the main driving motor 16 in a start of traveling and in the low vehicle speed region, and the two sub-driving motors 20 generate outputs only when a large output is needed in a high vehicle speed region (such as when the vehicle 1 is accelerated in the high vehicle speed region). As described above, the induction electric motor (sub-driving motor 20) capable of generating a large output in a high rotation region is used only in a high speed region, and a sufficient output may thereby be obtained when a large output is needed (such as in acceleration at a predetermined speed or higher), while an increase in a vehicle weight is suppressed to a low level.

Figure 8:
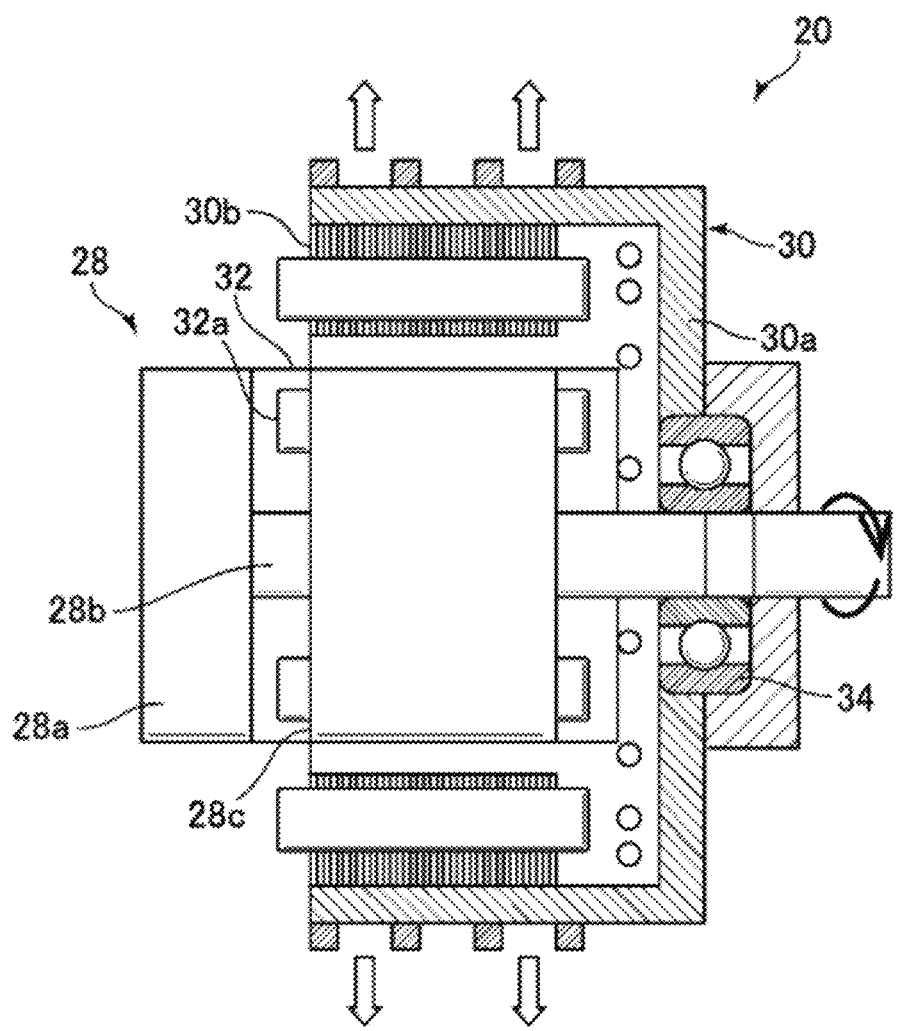
FIG. 8 is a cross-sectional view schematically illustrating a structure of a sub-driving motor employed for the hybrid driving apparatus according to the embodiment of the present invention.

Next, a description will be made about a configuration of the sub-driving motor 20 employed for the hybrid driving apparatus 10 according to the embodiment of the present invention with reference to FIG. 8. FIG. 8 is a cross-sectional view schematically illustrating a structure of the sub-driving motor 20.

As illustrated in FIG. 8, the sub-driving motor 20 is an outer-rotor type induction electric motor configured with a stator 28 and a rotor 30 rotating around the stator.

The stator 28 has a generally disk-shaped stator base 28*a*, a stator shaft 28*b* extending from the center of the stator base 28*a*, and a stator coil 28*c* attached to a periphery of the stator shaft 28*b*. Further, the stator coil 28*c* is housed in an electrically insulating liquid chamber 32, immersed in an electrically insulating liquid 32*a* with which this chamber 32 is filled, and thereby subjected to boiling cooling.

The rotor 30 is configured to be in a generally cylindrical shape so as to surround a periphery of the stator 28 and has a rotor body 30*a* configured to be in a generally cylindrical shape whose one end is closed and a rotor coil 30*b* disposed on an inner peripheral wall of the rotor body 30*a*. The rotor coil 30*b* is disposed to be opposed to the stator coil 28*c* such that an induced current is generated by a rotating magnetic field produced by the stator coil 28c. Further, the rotor 30 is supported by a bearing 34 attached to a tip end of the stator shaft 28b so as to smoothly rotate around the stator 28.

The stator base 28a is supported by the upper arm 8a and the lower arm 8b (FIG. 4) by which the front wheel of the vehicle 1 is suspended. Meanwhile, the rotor body 30a is directly fixed to the wheel (not illustrated) of the front wheel 2b. The alternate current resulting from conversion to an alternate current by the inverter 20a is caused to flow through the stator coil 28c, and the rotating magnetic field is produced. This rotating magnetic field causes the induced current to flow through the rotor coil 30b, and a driving force rotating the rotor body 30a is generated. As described above, driving forces produced in the sub-driving motors 20 directly rotate and drive the wheels (not illustrated) of the respective front wheels 2b.

Figure 9:
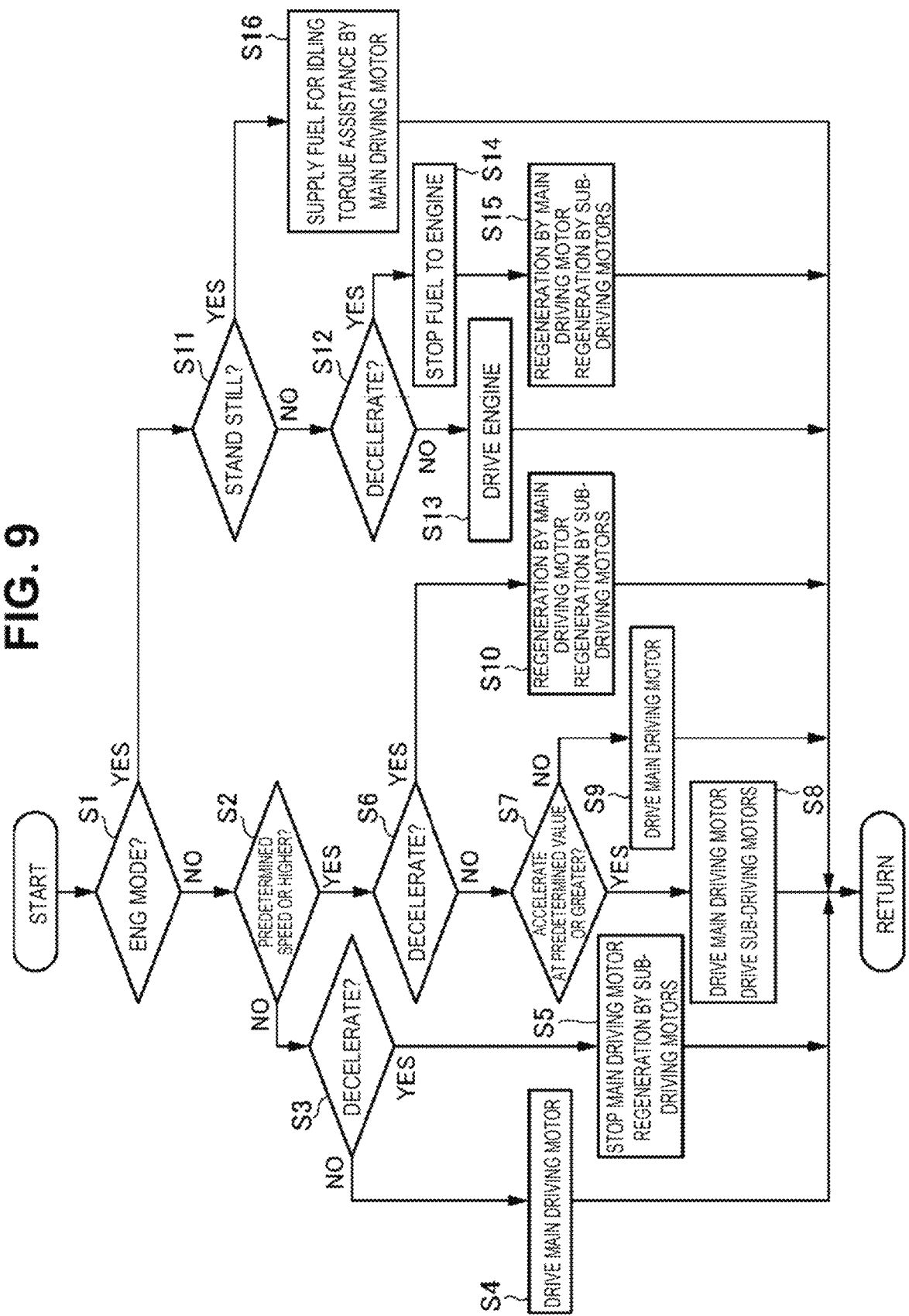
FIG. 9 is a flowchart of control by a control apparatus in the hybrid driving apparatus according to the embodiment of the present invention.
Figure 10:
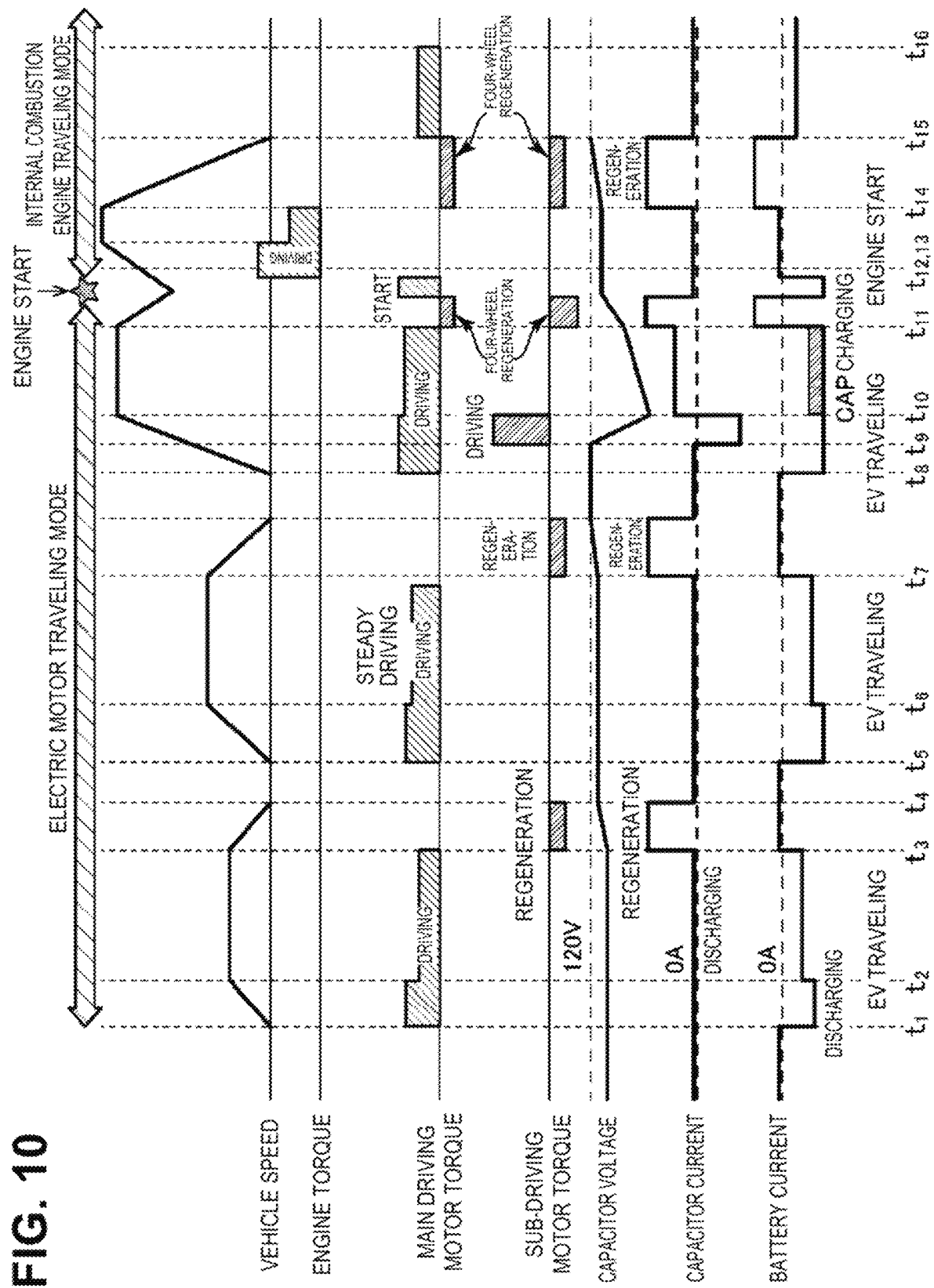
FIG. 10 is a graph representing one example of an action in each mode of the hybrid driving apparatus according to the embodiment of the present invention.

Next, a description will be made about actions of the electric motor traveling mode and internal combustion engine traveling mode executed by the control apparatus 24 with reference to FIG. 9 and FIG. 10. FIG. 9 is a flowchart of control by the control apparatus 24, and FIG. 10 is a graph representing one example of the action in each of the modes. Note that the flowchart illustrated in FIG. 9 is repeatedly executed during work of the vehicle 1 at a predetermined time interval.

The graph illustrated in FIG. 10 indicates, in order from the upper stage, the speed of the vehicle 1, the torque generated by the engine 12, the torque generated by the main driving motor 16, the torques generated by the sub-driving motors 20, the voltage of the capacitor 22, the current of the capacitor 22, and the current of the battery 18. Note that in the graphs representing the torque of the main driving motor 16 and the torques of the sub-driving motors 20, a positive value means a state where each of the motors generates a torque, and a negative value means a state where each of the motors performs regeneration from kinetic energy of the vehicle 1. Further, in the graph representing the current of the capacitor 22 and the current of the battery 18, a negative value means a state where electric power is supplied (discharged) to each of the motors, and a positive value means a state where electric power regenerated in each of the motors is charged.

First, in step S1 in FIG. 9, it is determined whether or not the vehicle 1 is set to the internal combustion engine traveling mode (ENG mode). That is, the vehicle 1 includes the switch (not illustrated) selecting either one of the internal combustion engine traveling mode and the electric motor traveling mode (EV mode). In step S1, it is determined which the mode selection switch 40 is set to. At time $t_1$ in FIG. 10, because the mode selection switch 40 is set to the electric motor traveling mode, the process of the flowchart of FIG. 9 moves to step S2.

Next, in step S2, it is determined whether or not the vehicle 1 is at a predetermined vehicle speed or higher, and the process moves to step S6 in a case of the predetermined vehicle speed or higher but moves to step S3 in a case of lower than the predetermined vehicle speed. At time $t_1$ in FIG. 10, because a driver causes the vehicle 1 to start traveling and the vehicle speed is low, the process of the flowchart moves to step S3.

Then, in step S3, it is determined whether or not the vehicle 1 is decelerated (a brake pedal (not illustrated) of the vehicle 1 is operated). The process moves to step S5 in a case of deceleration but moves to step S4 in a case of acceleration or constant speed traveling (the brake pedal (not illustrated) is not operated). At time $t_1$ in FIG. 10, because the driver causes the vehicle 1 to start traveling and accelerates the vehicle 1 (an accelerator pedal (not illustrated) of the vehicle 1 is operated by a predetermined amount or greater), the process of the flowchart moves to step S4, and one process of the flowchart of FIG. 9 finishes. In step S4, the main driving motor 16 generates a torque, and the vehicle speed rises (the period from time $t_1$ to $t_2$ in FIG. 10). Here, although a discharge current flows from the battery 18 supplying electric power to the main driving motor 16, because the sub-driving motors 20 do not generate torques, a discharge current from the capacitor 22 is maintained to be zero, and the voltage of the capacitor 22 does not change. Further, in the period from time $t_1$ to $t_2$ in FIG. 10, because the vehicle 1 is set to the electric motor traveling mode, the engine 12 is not driven (the engine 12 is not supplied with fuel and does not generate a torque).

In the example illustrated in FIG. 10, after the vehicle 1 is accelerated in the period between time $t_1$ and $t_2$, the vehicle 1 performs constant speed traveling until time $t_3$. During this period, as for the process of the flowchart in FIG. 9, processes of steps S1, S2, S3, and S4 are repeatedly executed. Because the torque generated by the main driving motor 16 becomes smaller in this low speed traveling than in acceleration, the current discharged from the battery 18 becomes smaller.

Next, at time $t_3$ in FIG. 10, in a case where the driver operates the brake pedal (not illustrated) of the vehicle 1, the process of the flowchart of FIG. 9 moves from step S3 to S5. In step S5, driving by the main driving motor 16 is stopped (no torque is generated), and regeneration of electric power from the kinetic energy of the vehicle 1 is performed by the sub-driving motors 20. The vehicle 1 is decelerated due to the regeneration from the kinetic energy, and the discharge current from the battery 18 becomes zero. Meanwhile, a charge current flows to the capacitor 22 by the regeneration of electric power by the sub-driving motors 20, and the voltage of the capacitor 22 rises.

In a case where the vehicle 1 stops at time $t_4$ in FIG. 10, the charge current to the capacitor 22 becomes zero, and the voltage of the capacitor 22 becomes a constant voltage. Next, until deceleration of the vehicle 1 is started (time $t_7$) after the vehicle 1 again starts traveling at time $t_5$ and reaches low speed traveling (time $t_6$), the processes of steps S1, S2, S3, and S4 are repeatedly executed in the flowchart of FIG. 9. In a case where deceleration of the vehicle 1 is started at time $t_7$, processes of steps S1, S2, S3, and S5 are repeatedly executed in the flowchart of FIG. 9, and electric power is regenerated by the sub-driving motors 20. As described above, while a start of traveling and stop are repeated at a comparatively low speed in an urban area or the like, the mode selection switch 40 is set to the electric motor traveling mode, the vehicle 1 completely functions as an electric automobile (EV), and the engine 12 does not generate a torque.

Then, in a case where the vehicle 1 starts traveling at time $t_8$ in FIG. 10, the processes of steps S1, S2, S3, and S4 are repeatedly executed in the flowchart of FIG. 9, and the vehicle 1 is accelerated. Next, at time $t_9$, in a case where the speed of the vehicle 1 exceeds a predetermined vehicle speed, the process of the flowchart moves from step S2 to S6. In step S6, it is determined whether or not the vehicle 1 is decelerated (the brake pedal is operated). Because the vehicle 1 is not decelerated at time $t_9$, the process of the flowchart moves to step S7. In step S7, it is determined whether or not the vehicle 1 is accelerated at a predetermined value or greater (the accelerator pedal of the vehicle 1 is operated by a predetermined amount or greater).

In the example illustrated in FIG. 10, because the vehicle 1 is accelerated at the predetermined value or greater at time $t_9$, the process moves to step S8, the main driving motor 16 is driven here, and the sub-driving motors 20 are also driven. As described above, when acceleration at the predetermined value or greater is performed at a vehicle speed of a predetermined value or greater in the electric motor traveling mode, electric power is supplied to the main driving motor 16 and the sub-driving motors 20 in order to obtain necessary motive power, and the vehicle 1 is driven by those. In this case, electric power is supplied from the battery 18 to the main driving motor 16, and electric power is supplied from the capacitor 22 to the sub-driving motors 20. Electric power is supplied from the capacitor 22 in such a manner, and the voltage of the capacitor 22 thereby lowers. While the vehicle 1 is driven by the main driving motor 16 and the sub-driving motors 20 (the period between time $t_9$ and $t_{10}$), processes of steps S1, S2, S6, S7, and S8 are repeatedly executed in the flowchart.

At time $t_{10}$ in FIG. 10, in a case where the vehicle 1 transits to constant speed traveling (an operation of the accelerator pedal becomes smaller than a predetermined amount), processes of steps S1, S2, S6, S7, and S9 are repeatedly executed in the flowchart. In step S9, driving by the sub-driving motors 20 is stopped (no torque is generated), and the vehicle 1 is driven only by the main driving motor 16. As described above, even in a state where the vehicle 1 travels at a predetermined vehicle speed or higher, the vehicle 1 is driven only by the main driving motor 16 in a state where acceleration at a predetermined amount or greater is not performed.

Further, because the voltage of the capacitor 22 lowers to a predetermined value or lower due to driving of the sub-driving motors 20 in the period between time $t_9$ and $t_{10}$, the control apparatus 24 sends a signal to the high voltage DC-to-DC converter 26a at time $t_{10}$ and charges the capacitor 22. That is, the high voltage DC-to-DC converter 26a boosts the electric charge accumulated in the battery 18 and charges the capacitor 22. Accordingly, in the period from time $t_{10}$ to $t_{11}$ in FIG. 10, a current for driving the main driving motor 16 and a current for charging the capacitor 22 are discharged from the battery 18. Note that in a case where large electric power is regenerated by the sub-driving motors 20 and the voltage of the capacitor 22 rises to a predetermined value or greater, the control apparatus 24 sends a signal to the high voltage DC-to-DC converter 26a, drops the voltage of the capacitor 22, and charges the battery 18. As described above, the electric power regenerated by the sub-driving motors 20 is consumed by the sub-driving motors 20 or temporarily accumulated in the capacitor 22 and is thereafter charged to the battery 18 via the high voltage DC-to-DC converter 26a.

At time $t_{11}$ in FIG. 10, in a case where the vehicle 1 is decelerated (the brake pedal is operated), processes of steps S1, S2, S6, and S10 are repeatedly executed in the flowchart. In step S10, regeneration of electric power from the kinetic energy of the vehicle 1 is performed by both of the main driving motor 16 and the sub-driving motors 20. The electric power regenerated by the main driving motor 16 is accumulated in the battery 18, and the electric power regenerated by the sub-driving motors 20 is accumulated in the capacitor 22. As described above, in a case where the brake pedal is operated at a predetermined vehicle speed or higher, regeneration of electric power is performed by both of the main driving motor 16 and the sub-driving motors 20, and electric charges are accumulated in the battery 18 and the capacitor 22.

Next, at time $t_{12}$ in FIG. 10, the switch (not illustrated) is operated by the driver, the vehicle 1 is switched from the electric motor traveling mode to the internal combustion engine traveling mode, and the accelerator pedal (not illustrated) is pushed. When the vehicle 1 is switched to the internal combustion engine traveling mode, the process of the flowchart of FIG. 9 by the control apparatus 24 moves from step S1 to S11, processes of step S11 and subsequent steps are executed.

First, in step S11, it is determined whether or not the vehicle 1 stands still. In a case where the vehicle 1 does not stand still (a case of traveling), in step S12, it is determined whether or not the vehicle 1 is being decelerated (whether or not the brake pedal (not illustrated) is operated). At time $t_{12}$ in FIG. 10, because the vehicle 1 is traveling and the driver operates the accelerator pedal, the process of the flowchart of FIG. 9 moves to step S13.

In step S13, supply of fuel to the engine 12 is started, and the engine 12 generates a torque. That is, in this embodiment, because an output shaft (not illustrated) of the engine 12 is directly coupled with an output shaft (not illustrated) of the main driving motor 16, the output shaft of the engine 12 is always rotated together with driving of the main driving motor 16. However, in the electric motor traveling mode, the engine 12 does not generate a torque because fuel supply to the engine 12 is not performed. The engine 12 generates a torque when fuel supply is started in the internal combustion engine traveling mode.

Further, immediately after switching is performed from the electric motor traveling mode to the internal combustion engine traveling mode, the control apparatus 24 causes the main driving motor 16 to generate a torque for engine starting (the period from $t_{12}$ to $t_{13}$ in FIG. 10). This torque for engine starting is generated to enable the vehicle 1 to travel and to inhibit non-uniformity of torque occurring before and after the engine 12 generates a torque until the engine 12 actually generates a torque after the fuel supply to the engine 12 is started. Further, in this embodiment, in a case where the engine speed of the engine 12 at the time point of switching to the internal combustion engine traveling mode is lower than a predetermined engine speed, the fuel supply to the engine 12 is not started, but the fuel supply is started at the time point when the engine 12 reaches the predetermined engine speed or higher by the torque for engine starting. In this embodiment, when the engine speed of the engine 12 detected by the engine speed sensor 48 rises to 2,000 rpm or higher, the fuel supply is started.

While the vehicle 1 is accelerating or performing constant speed traveling after the engine 12 is started, processes of steps S1, S11, S12, and S13 are repeatedly executed in the flowchart of FIG. 9 (the period from time $t_{13}$ to $t_{14}$ in FIG. 10). As described above, in the internal combustion engine traveling mode, motive power for driving the vehicle 1 is solely output from the engine 12, and the main driving motor 16 and the sub-driving motors 20 do not output motive power for driving the vehicle 1. Thus, the driver may enjoy a driving feeling of the vehicle 1 driven by the internal combustion engine.

Next, at time $t_{14}$ in FIG. 10, in a case where the driver operates the brake pedal (not illustrated), the process of the flowchart of FIG. 9 moves from step S12 to S14. In step S14, the fuel supply to the engine 12 is stopped, and fuel consumption is inhibited. Then, in step S15, regeneration of electric energy from the kinetic energy of the vehicle 1 is performed by the main driving motor 16 and the sub-driving motors 20, and charge currents flow to the battery 18 and the capacitor 22. As described above, during deceleration of the vehicle 1, processes of steps S1, S11, S12, S14, and S15 are repeatedly executed (the period from time $t_{14}$ to $t_{15}$ in FIG. 10).

Note that during deceleration of the vehicle 1 in the internal combustion engine traveling mode, the control apparatus 24 executes down-shifting torque adjustment by driving the sub-driving motors 20 in switching (in gear-shifting) of the transmission 14c as a stepped transmission. A torque generated by this torque adjustment is used as supplementation against an instantaneous torque slip or the like and does not correspond to a torque driving the vehicle 1. Details of the torque adjustment will be described later.

Meanwhile, in a case where the vehicle 1 stops at time $t_{15}$ in FIG. 10, the process of the flowchart of FIG. 9 moves from step S11 to S16. In step S16, the control apparatus 24 supplies minimum fuel necessary for maintaining idling of the engine 12. Further, the control apparatus 24 causes the main driving motor 16 to generate an assisting torque so that the engine 12 may maintain idling at a low engine speed. As described above, while the vehicle 1 stands still, processes of steps S1, S11, and S16 are repeatedly executed (the period from time $t_{15}$ to $t_{16}$ in FIG. 10).

In this embodiment, although the engine 12 is a flywheel-less engine, the assisting torque generated by the main driving motor 16 serves as a pseudo flywheel, and the engine 12 may maintain smooth idling at a low engine speed. Further, a flywheel-less engine is employed, high responsiveness of the engine 12 may thereby be obtained during traveling in the internal combustion engine traveling mode, and the driver may enjoy a drive with excellent feeling.

Further, in a case where the vehicle 1 starts traveling in the internal combustion engine traveling mode from a state where the vehicle 1 stands still, the control apparatus 24 sends a signal to the main driving motor 16 and raises the rotation speed of the main driving motor 16 (=the engine speed of the engine 12) to a predetermined rotation speed. After the engine speed rises to a predetermined engine speed, the control apparatus 24 supplies fuel for engine driving to the engine 12 and generates driving by the engine 12, and traveling in the internal combustion engine traveling mode is performed.

Next, a description will be made about the torque adjustment in switching (in gear-shifting) of the transmission 14c with reference to FIG. 11.

Figure 11:
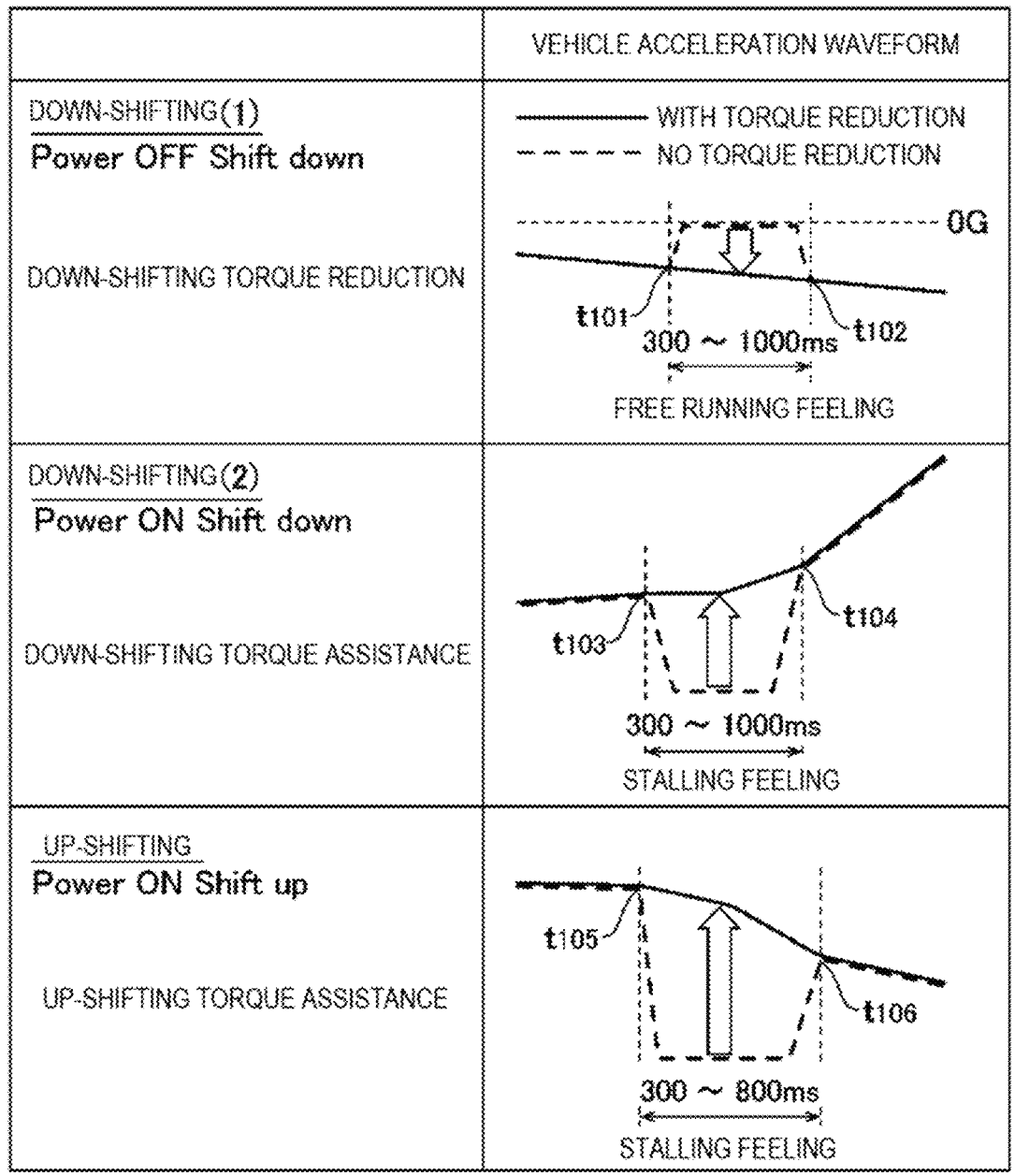
FIG. 11 is a diagram schematically illustrating a change in acceleration exerted on the vehicle in a case where downshifting or up-shifting of a transmission is performed in the hybrid driving apparatus according to the embodiment of the present invention.

FIG. 11 is a diagram schematically illustrating a change in acceleration exerted on the vehicle in a case where down-shifting or up-shifting of the transmission 14c is performed and respectively illustrates examples of down-shifting torque reduction, down-shifting torque assistance, and up-shifting torque assistance in order from the upper stage.

The hybrid driving apparatus 10 according to the embodiment of the present invention is configured such that the control apparatus 24 automatically switches the clutch 14b and the transmission 14c in accordance with the vehicle speed or the engine speed in a case where setting to an automatic gear-shifting mode is made in the internal combustion engine traveling mode. As illustrated in the upper stage in FIG. 11, when down-shifting (gear-shifting to a low speed side) of the transmission 14c is performed (time $t_{101}$ in FIG. 11) in a state where negative acceleration is exerted on the vehicle 1 in deceleration, the control apparatus 24 disconnects the clutch 14b, and the output shaft of the engine 12 is disconnected from the main driving wheels (rear wheels 2a). As described above, when the engine 12 is disconnected from the main driving wheels, the rotational resistance of the engine 12 is not exerted on the main driving wheels. Thus, as indicated by the broken line in the upper stage in FIG. 11, the acceleration exerted on the vehicle 1 instantaneously changes to the positive side. Next, when the control apparatus 24 connects the clutch 14b at time $t_{102}$ of completion of down-shifting, the acceleration again changes to the negative side. In general, although a period from a start to completion of down-shifting (the period from time $t_{101}$ to $t_{102}$) is 300 to 1,000 msec, the occupant may experience a free running feeling due to a so-called torque shock in which the torque exerted on the vehicle instantaneously changes and may experience discomfort.

In the hybrid driving apparatus 10 of this embodiment, the control apparatus 24 sends a control signal to the sub-driving motors 20 in down-shifting, performs the torque adjustment, and inhibits the free running feeling of the vehicle 1. Specifically, when the control apparatus 24 sends a signal to the clutch 14b and the transmission 14c and performs down-shifting, the control apparatus 24 predicts a change in acceleration to occur to the vehicle 1 and causes the sub-driving motors 20 to execute regeneration of energy. Accordingly, as indicated by the solid line in the upper stage in FIG. 11, an instantaneous rise (a change to the positive side) of acceleration of the vehicle 1 due to a torque shock is inhibited, and the free running feeling may be inhibited. Further, in this embodiment, supplementation against a torque shock in the main driving wheels (rear wheels 2a) accompanying down-shifting is performed by the sub-driving wheels (front wheels 2b) with the sub-driving motors 20. Thus, the torque adjustment may be performed without being influenced by dynamic characteristics of the motive power transmission mechanism 14 transmitting motive power from the engine 12 to the main driving wheels.

Further, as indicated by the broken line in the middle stage in FIG. 11, when down-shifting is started at time $t_{103}$ in a state where positive acceleration is exerted on the vehicle 1 in acceleration, the output shaft of the engine 12 is disconnected from the main driving wheels (rear wheels 2a). Accordingly, because a driving torque by the engine 12 is not exerted on the rear wheels 2a and a torque shock occurs, the occupant may experience a stalling feeling until down-shifting is completed at time $t_{104}$. That is, the acceleration of the vehicle 1 instantaneously changes to the negative side at time $t_{103}$ when down-shifting is started, and the acceleration changes to the positive side at time $t_{104}$ when down-shifting is completed.

In the hybrid driving apparatus 10 of this embodiment, when down-shifting is performed, the control apparatus 24 predicts a change in acceleration to occur to the vehicle 1 and causes the sub-driving motors 20 to generate driving forces. Accordingly, as indicated by the solid line in the middle stage in FIG. 11, instantaneous lowering (a change to the negative side) of acceleration of the vehicle 1 due to a torque shock is inhibited, and the stalling feeling is inhibited.

Further, as indicated by the broken line in the lower stage in FIG. 11, when up-shifting is started at time $t_{105}$ in a state where positive acceleration is exerted on the vehicle 1 in acceleration (the positive acceleration lowers as time elapses), the output shaft of the engine 12 is disconnected from the main driving wheels (rear wheels 2a). Accordingly, because the driving torque by the engine 12 is not exerted on the rear wheels 2a and a torque shock occurs, the occupant may experience the stalling feeling until up-shifting is completed at time $t_{106}$. That is, the acceleration of the vehicle 1 instantaneously changes to the negative side at time $t_{105}$ when up-shifting is started, and the acceleration changes to the positive side at time $t_{106}$ when up-shifting is completed.

In this embodiment, when up-shifting is performed, the control apparatus 24 predicts a change in acceleration to occur to the vehicle 1 and the automatic transmission output rotation sensor 52 and causes the sub-driving motors 20 to generate driving forces. Accordingly, as indicated by the solid line in the lower stage in FIG. 11, instantaneous lowering (a change to the negative side) of acceleration of the vehicle 1 due to a torque shock is inhibited, and the stalling feeling is inhibited.

As described above, driving torque adjustment by the sub-driving motors 20 in down-shifting or up-shifting of the transmission 14c is performed in very short time and does not substantially drive the vehicle 1. Thus, the motive power generated by the sub-driving motors 20 is used for regeneration by the sub-driving motors 20 and may be produced by the electric charge accumulated in the capacitor 22. Further, the driving torque adjustment by the sub-driving motors 20 may be applied to an automatic transmission with a torque converter, an automatic transmission with no torque converter, an automated manual transmission, and so forth.

In the hybrid driving apparatus 10 of the embodiment of the present invention, the engine 12 generates a driving force in the internal combustion engine traveling mode (the period from time $t_{12}$ in FIG. 10), and the main driving motor 16 and the sub-driving motors 20 do not generate driving forces for driving the vehicle 1. Thus, the driver may sufficiently enjoy the driving feeling of the vehicle 1 driven by the internal combustion engine while using the hybrid driving apparatus 10. Further, in a start of traveling and steady traveling of the vehicle 1 (the periods from time $t_1$ to $t_3$ and from $t_5$ to $t_7$ in FIG. 10), the permanent magnet electric motor as the main driving motor 16 generates a driving force (FIG. 7), the permanent magnet electric motor being capable of obtaining a comparatively large torque in a region of a low rotation speed. Thus, the vehicle 1 may efficiently be driven. Meanwhile, in deceleration of the vehicle 1 (the periods from time $t_3$ to $t_4$, from $t_7$, and so forth in FIG. 10), the induction electric motors as the sub-driving motors 20 provided to the front wheels 2b (sub-driving wheels) regenerate electric power. Thus, electric power may be regenerated by comparatively light induction electric motors, and energy efficiency may be improved while a weight increase of the vehicle 1 is inhibited.

In addition, in the hybrid driving apparatus 10 of this embodiment, a flywheel-less engine is employed as the engine 12, weight reduction can thereby be realized in spite of a hybrid driving apparatus, and a response of the engine 12 in the internal combustion engine traveling mode is also improved. The driver can enjoy a further excellent driving feeling. Further, in the internal combustion engine traveling mode, the main driving motor 16 generates a torque for maintaining idling of the internal combustion engine (the period from time $t_{15}$ to $t_{16}$ in FIG. 10). Thus, even if a flywheel-less engine is employed, stable idling with less vibration can be performed.

Further, in the hybrid driving apparatus 10 of this embodiment, the front wheels 2b (sub-driving wheels) generate driving forces or braking forces (FIG. 11) such that a torque shock is reduced, the torque shock occurring in gear-shifting of the transmission 14c provided to the motive power transmission mechanism 14 for driving the rear wheels 2a (main driving wheels). Thus, the driving forces or braking forces generated by the front wheels 2b are not influenced by dynamic characteristics of the motive power transmission mechanism 14, the driving forces or braking forces can directly be applied to the vehicle 1, and a torque shock can effectively be reduced.

Further, in the hybrid driving apparatus 10 of this embodiment, because the sub-driving motors 20 are driven only by electric power supplied via the capacitor 22 (FIG. 5), the sub-driving motors 20 can instantaneously generate high torques, and a torque shock can more effectively be reduced. Further, because a portion of necessary electric power is supplied from the capacitor 22, the battery 18 can further be downsized.

Further, in the hybrid driving apparatus 10 of this embodiment, because a portion of electric power regenerated by the sub-driving motors 20 is charged from the capacitor 22 to the battery 18 via the high voltage DC-to-DC converter 26a, electric power regenerated by the sub-driving motors 20 can also be used for driving of the main driving motor 16. Accordingly, kinetic energy of the vehicle 1 can efficiently be collected as electric energy.

In the foregoing, a preferable embodiment of the present invention has been described; however, various alterations may be applied to the above-described embodiment. In particular, in the above-described embodiment, the hybrid driving apparatus of the present invention is applied to an FR vehicle; however, the present invention may be applied to various types of vehicles such as a so-called FF vehicle in which an engine is disposed in a front area of the vehicle and front wheels are used as main driving wheels and a so-called RR vehicle in which an engine is disposed in a rear area of the vehicle and rear wheels are used as main driving wheels.

REFERENCE SIGNS LIST 1 vehicle
2a rear wheel (main driving wheel)
2b front wheel (sub-driving wheel)
4a subframe
4b front side frame
4c dash panel
4d propeller shaft tunnel
6a engine mount
6b capacitor mount
8a upper arm
8b lower arm
8c spring
8d shock absorber
10 hybrid driving apparatus
12 engine (internal combustion engine)
14 motive power transmission mechanism
14a propeller shaft
14b clutch
14c transmission (stepped transmission)
14d torque tube
16 main driving motor (main driving electric motor)
16a inverter
18 battery (accumulator)
20 sub-driving motor (sub-driving electric motor)
20a inverter
22 capacitor
22a bracket
22b harness
24 control apparatus
26a high voltage DC-to-DC converter (voltage converter)
26b low voltage DC-to-DC converter
28 stator
28a stator base
28b stator shaft
28c stator coil
30 rotor
30a rotor body 30*b* rotor coil
32 electrically insulating liquid chamber
32*a* electrically insulating liquid
34 bearing

The invention claimed is:

1. A hybrid driving apparatus for driving a vehicle, the hybrid driving apparatus comprising:
an internal combustion engine that generates a driving force for main driving wheels of the vehicle;
a motive power transmission that transmits the driving force generated by the internal combustion engine to the main driving wheels;
a main driving electric motor as a permanent magnet electric motor that generates a driving force for the main driving wheels;
an accumulator that accumulates electric power for causing the main driving electric motor to work;
sub-driving electric motors as induction electric motors being connected with sub-driving wheels of the vehicle so as to be capable of transmitting motive power to the sub-driving wheels; and
control circuitry configured to control the internal combustion engine, the main driving electric motor, and the sub-driving electric motors and execute an electric motor traveling mode and an internal combustion engine traveling mode, wherein
the driving force generated by the main driving electric motor is transmitted to the main driving wheels via at least a portion of the motive power transmission,
the control circuitry is further configured to cause only the main driving electric motor to generate the driving force in a start of traveling and steady traveling of the vehicle in the electric motor traveling mode and cause the sub-driving electric motors to regenerate electric power in deceleration of the vehicle,
the control circuitry is further configured to cause the internal combustion engine to generate the driving force but not cause the main driving electric motor and the sub-driving electric motors to generate driving forces for driving the vehicle in the internal combustion engine traveling mode, and
the internal combustion engine is a flywheel-less engine that does not include a flywheel, and the control circuitry is further configured to cause the main driving electric motor to generate a torque for maintaining idling of the internal combustion engine in the internal combustion engine traveling mode.

2. The hybrid driving apparatus according to claim 1, further comprising:
a stepped transmission provided in an intermediate portion of the motive power transmission that transmits motive power to the main driving wheels, wherein
in the internal combustion engine traveling mode, the control circuitry is further configured to control the sub-driving electric motors such that a torque shock in gear-shifting of the stepped transmission is reduced and cause the sub-driving wheels to generate driving forces or braking forces.

3. The hybrid driving apparatus according to claim 1, further comprising:
a capacitor that accumulates electric power regenerated by the sub-driving electric motors, wherein
the sub-driving electric motors are driven only by electric power supplied via the capacitor.

4. The hybrid driving apparatus according to claim 3, wherein
the capacitor and the accumulator are connected together in series, and after the electric power regenerated by the sub-driving electric motors is accumulated in the capacitor, a portion of an accumulated electric charge is charged to the accumulator via a voltage converter.

5. The hybrid driving apparatus according to claim 1, wherein
each of the sub-driving electric motors is provided to each of the sub-driving wheels in an unsprung portion of the vehicle.

6. The hybrid driving apparatus according to claim 5, wherein
the sub-driving electric motors are configured to directly drive the sub-driving wheels.

7. The hybrid driving apparatus according to claim 5, wherein
each of the sub-driving electric motors is an in-wheel electric motor build in each of the sub-driving wheels.

8. The hybrid driving apparatus according to claim 1, wherein
the control circuitry is further configured to cause the main driving electric motor and the sub-driving electric motors to generate the driving forces in acceleration of the vehicle at a predetermined vehicle speed or higher in the electric motor traveling mode.

9. The hybrid driving apparatus according to claim 3, wherein
the capacitor and the accumulator are connected together in series,
the capacitor is disposed between the sub-driving wheels, and
the sub-driving electric motors are driven at a higher voltage than the main driving electric motor.

* * * * *